Patented July 25, 1939

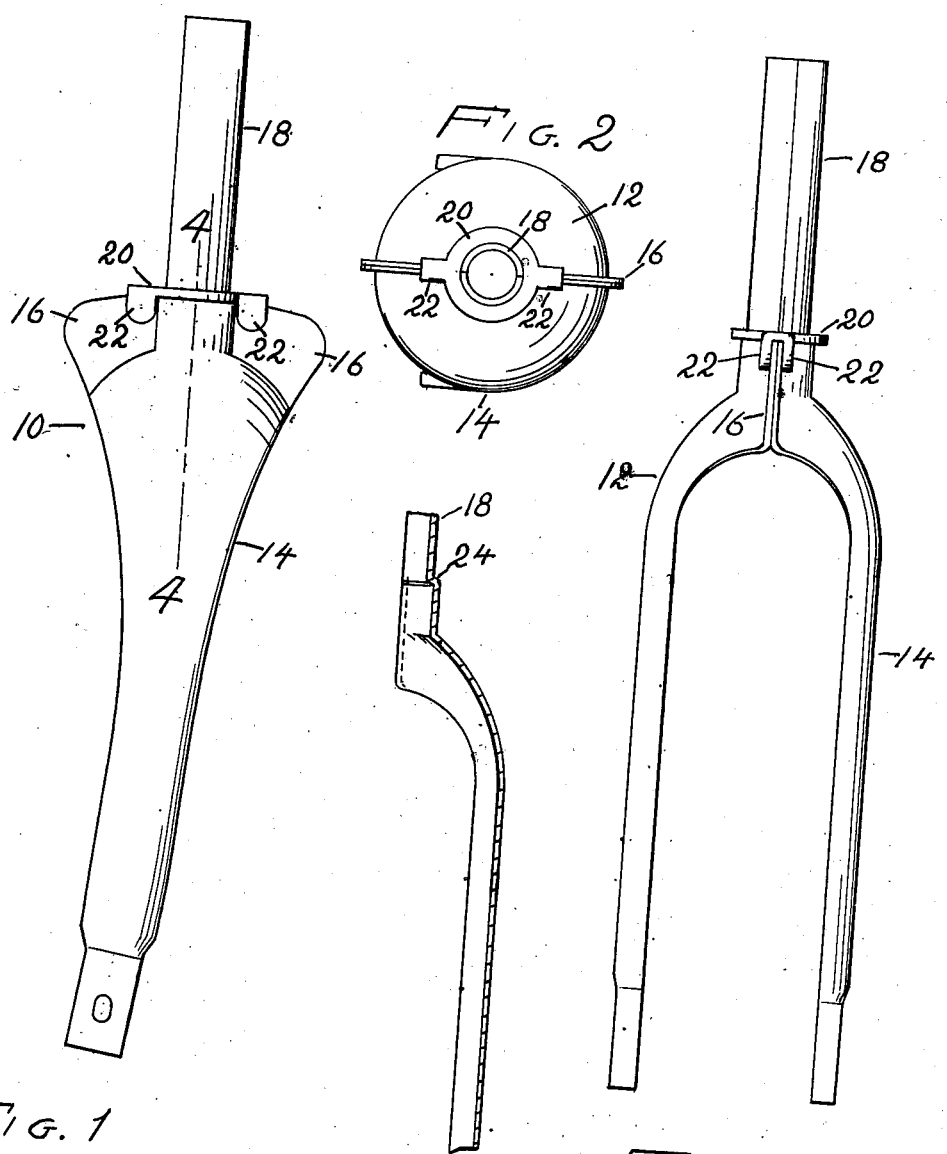

2,167,020

UNITED STATES PATENT OFFICE 2,167,020

VELOCIPEDE FORK

Bert J. Anderson, Hammond, Ind.

Application February 24, 1936, Serial No. 65,375

1 Claim. (Cl. 280—279)

This invention relates to an improved velocipede fork and has for one of its principal objects the provision of means for constructing a relatively light weight, though rugged and sturdy device of sheet metal.

Another and further important object of advantage resides in the provision of means whereby two formed stampings may be secured together to form a complete velocipede fork including the stem.

A still further important object of the invention resides in the elimination of welding or otherwise securing a stem to the fork.

Still another object of importance and advantage is the provision of means for economically securing the two stampings together.

An additional object of importance is the provision of means for economically producing an article of the kind referred to in a limited number of manufacturing operations.

Additional objects of importance and advantage will become apparent as the following detailed description progresses, reference being had to the accompanying drawing, wherein Fig. 1 is a side elevational view of a velocipede fork which embodies the invention, Fig. 2 is a top plan view thereof, Fig. 3 is a front elevational view of the fork, and Fig. 4 is a fragmental section of one stamping taken on line 4—4 of Fig. 1.

As shown in the drawing:

The reference numeral 10 indicates in general the fork of this invention, which in the preferred embodiment as shown in the drawing, is constructed of two complementary stampings 12 and 14. Each stamping is so shaped that the lower portion thereof forms a prong of the fork, while the upper portion is of semi-cylindrical formation. In assembly the upper portions of the stampings are in edge to edge engagement and thus form a cylindrical stem, as is clearly shown in the drawing.

Formed on opposed sides of each stamping 12 and 14, intermediate the ends thereof, are securing fins 16 which have a flat inner surface. When the complementary stampings are brought together the fins 16 provide an ample surface for spot welding, riveting or otherwise suitably securing the parts together.

When the stampings 12 and 14 are assembled the upper portions thereof form a cylindrical stem 18 which is adapted to be inserted through the head bearings of a velocipede and have a handle bar or other steering mechanism attached to the end thereof.

Where it is desirable to produce a more rigid and sturdy construction than is heretofore set forth and described, a washer 20 having downwardly turned opposed portions 22 is positioned on the stem 18, as is best shown in Figs. 1 and 3. The washer in addition to securing the stampings also forms a thrust bearing on which the frame of the velocipede may ride.

In the preferred embodiment of the improved fork of this invention a portion of the stem 18 at the base thereof is expanded to form a shoulder 24 which is adapted to serve as a thrust bearing or as a support for the washer 20. It will also be apparent that the washer 20 is supported in the front and rear by the upper edges of the fins 16.

It will be further apparent from the foregoing that herein is provided a rigid and sturdy fork construction which eliminates the necessity of welding or otherwise securing an operating stem to the upper end thereof.

Additionally, because of the elimination of welding or riveting the stem to the fork proper, no obstructions are present within the lower portion of the stem. Therefore, a long stem handle bar may be used with the improved fork of this invention and consequently a greater range of adjustability is available between handle bar and velocipede.

Moreover breakage of the welded joint between stem and fork, and the loosening of such joined parts, is totally eliminated in the construction of the improved fork here described.

I am aware that many changes may be made and numerous details of construction varied throughout a wide range without departing from the principles of this invention and I, therefore, do not purpose limiting the patent granted hereon otherwise than is necessitated by the prior art.

I claim as my invention:

A combination velocipede fork and steering post therefor comprising, a pair of complementary stampings, the lower portion of each stamping being shaped to form one prong of the fork, the upper portion of each stamping being curled into semi-cylindrical formation, and securing fins on opposed sides of each stamping intermediate the ends thereof, said fins providing a support for a thrust bearing.

BERT J. ANDERSON.